United States Patent
Gibson et al.

(10) Patent No.: US 11,159,261 B2
(45) Date of Patent: *Oct. 26, 2021

(54) METHODS AND SYSTEMS FOR PERSONALIZING USER EXPERIENCE BASED ON NOSTALGIA METRICS

(71) Applicant: Spotify AB, Stockholm (SE)

(72) Inventors: Clay Gibson, New York, NY (US); Santiago Gil, Portland, OR (US); Ian Anderson, New York, NY (US); Oguz Semerci, New York, NY (US); Scott Wolf, New York, NY (US); Margreth Mpossi, Stamford, CT (US)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/892,116

(22) Filed: Jun. 3, 2020

(65) Prior Publication Data

US 2020/0295859 A1    Sep. 17, 2020

Related U.S. Application Data

(63) Continuation of application No. 16/570,896, filed on Sep. 13, 2019, now Pat. No. 10,707,982, which is a
(Continued)

(51) Int. Cl.
*H04H 60/45*    (2008.01)
*G06F 16/435*    (2019.01)
(Continued)

(52) U.S. Cl.
CPC ........... *H04H 60/45* (2013.01); *G06F 16/435* (2019.01); *G06F 16/4387* (2019.01);
(Continued)

(58) Field of Classification Search
CPC ...... H04H 60/45; H04H 60/33; G06F 16/435; G06F 16/4387
(Continued)

(56) References Cited

U.S. PATENT DOCUMENTS

2014/0129229 A1*  5/2014  Goldstein ............ H04R 1/1016
                                                    704/260
2014/0337915 A1* 11/2014  Kanee ................ H04N 21/4627
                                                    726/1
(Continued)

OTHER PUBLICATIONS

Gibson, Office Action, U.S. Appl. No. 15/663,586, dated Nov. 16, 2017, 7 pgs.
(Continued)

*Primary Examiner* — John J Lee
(74) *Attorney, Agent, or Firm* — Morgan, Lewis & Bockius LLP

(57) ABSTRACT

A server system accesses a profile of a user of the media-providing service. The profile indicates a demographic group of the user. For each track of a plurality of tracks, the server system determines a year associated with the track. The server system selects content for the user based at least in part on an affinity of members of the demographic group, as compared to members of other demographic groups, of music from the year associated with the track. The server system provides the selected content to a client device associated with the user.

20 Claims, 6 Drawing Sheets

Related U.S. Application Data continuation of application No. 16/041,584, filed on Jul. 20, 2018, now Pat. No. 10,454,603, which is a continuation of application No. 15/663,586, filed on Jul. 28, 2017, now Pat. No. 10,033,474.

(60) Provisional application No. 62/521,942, filed on Jun. 19, 2017.

(51) Int. Cl.
*H04H 60/33* (2008.01)
*H04H 60/40* (2008.01)
*G06F 16/438* (2019.01)
*H04H 60/31* (2008.01)
*H04H 60/66* (2008.01)
*H04H 60/46* (2008.01)
*G06F 16/635* (2019.01)

(52) U.S. Cl.
CPC ........... *G06F 16/635* (2019.01); *H04H 60/31* (2013.01); *H04H 60/33* (2013.01); *H04H 60/40* (2013.01); *H04H 60/46* (2013.01); *H04H 60/66* (2013.01); *H04H 2201/30* (2013.01)

(58) Field of Classification Search
USPC .......................... 455/3.01, 3.05, 67.11, 3.06
See application file for complete search history.

(56) References Cited

U.S. PATENT DOCUMENTS

2016/0088352 A1\* 3/2016 Agarwal .......... H04N 21/44222
725/12
2017/0124074 A1 5/2017 Cama et al.

OTHER PUBLICATIONS

Gibson, Notice of Allowance, U.S. Appl. No. 15/663,586, dated Mar. 27, 2018, 7 pgs.
Gibson, Office Action, U.S. Appl. No. 16/041,584, dated Oct. 18, 2018, 9 pgs.
Gibson, Notice of Allowance, U.S. Appl. No. 16/041,584, dated Jun. 14, 2019, 8 pgs.
Gibson, Notice of Allowance, U.S. Appl. No. 16/570,896, dated Mar. 4, 2020, 8 pgs.

\* cited by examiner

200

```
┌─────────────────────────────────────────────────────────────────────┐
│ At a server system of a media-providing service having one or more  │── 202
│ processors and memory storing instructions for execution by the one │
│ or more processors:                                                 │
└─────────────────────────────────────────────────────────────────────┘
                                  ▼
┌─────────────────────────────────────────────────────────────────────┐
│ Access a listening history of a user of the media-providing service.│── 204
│                  The user is in a demographic group                  │
│  ┌───────────────────────────────────────────────────────────────┐  │
│  │  The listening history is for a period of time preceding a    │──── 206
│  │                         current time                          │  │
│  └───────────────────────────────────────────────────────────────┘  │
└─────────────────────────────────────────────────────────────────────┘
                                  ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐
│ For each track of a plurality of tracks in the listening history of │── 208
│           the user, determine a year associated with the track      │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘
                                  ▼
┌─────────────────────────────────────────────────────────────────────┐
│ For each track of the plurality of tracks in the listening history  │── 210
│ of the user, calculate a first metric based at least in part on an  │
│ affinity of members of the demographic group, as compared to        │
│ members of other demographic groups, for the track                  │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐ │
│  │  The first metric is further based on an affinity of the       │──── 212
│  │  members of the demographic group, as compared to the members  │ │
│  │  of the other demographic groups, for music from the year      │ │
│  │  associated with the track                                     │ │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘ │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐ │
│  │  The demographic group includes members with ages within a    │──── 214
│  │  particular age range and the other demographic groups include│ │
│  │  members with ages that are not within the particular age range│ │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘ │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐ │
│  │  The demographic group includes members of a particular       │──── 216
│  │  country and the other demographic groups include members of  │ │
│  │  one or more countries that are not the particular country    │ │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘ │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐ │
│  │  The demographic group includes members of a particular       │──── 218
│  │  gender and the other demographic groups include members of   │ │
│  │  one or more genders that are not the particular gender       │ │
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘ │
└─────────────────────────────────────────────────────────────────────┘
                                  ▼
┌─────────────────────────────────────────────────────────────────────┐
│ Average the first metrics for the plurality of tracks in the        │── 220
│ listening history of the user to determine a second metric          │
└─────────────────────────────────────────────────────────────────────┘
                                  ▼
                                 (A)
```

FIGURE 2A

METHODS AND SYSTEMS FOR PERSONALIZING USER EXPERIENCE BASED ON NOSTALGIA METRICS

RELATED APPLICATIONS

This application is a continuation of U.S. patent application Ser. No. 16/570,896, filed Sep. 13, 2019, entitled "Methods and Systems for Personalizing User Experience Based on Nostalgia Metrics," which is a continuation of U.S. patent application Ser. No. 16/041,584, now U.S. Pat. No. 10,454,603, filed Jul. 20, 2018, entitled "Methods and Systems for Personalizing User Experience Based on Nostalgia Metrics," which is a continuation of U.S. patent application Ser. No. 15/663,586, now U.S. Pat. No. 10,033,474, filed Jul. 28, 2017, entitled "Methods and Systems for Personalizing User Experience Based on Nostalgia Metrics," which claims priority to U.S. Provisional Application No. 62/521,942, filed Jun. 19, 2017, entitled "Methods and Systems for Personalizing User Experience Based on Nostalgia Metrics," all of which are incorporated by reference in their entirety.

TECHNICAL FIELD

The disclosed implementations relate generally to personalizing the user experience for media streaming, and, in particular, to personalizing content in accordance with one or more metrics that measure degrees of nostalgia.

BACKGROUND

Access to electronic media, such as music and video content, has expanded dramatically over time. As a departure from physical media, media content providers (i.e., media-providing services) stream media to electronic devices (e.g., across wireless networks), improving the convenience with which users can digest and experience such content. As part of the service they provide and to assist users in having a positive user experience (e.g., in discovering new content and/or features), media content providers track and process user data in an attempt to understand user preferences, and ultimately to provide relevant content personalization.

SUMMARY

Accordingly, there is a need for systems and methods for personalizing media content in accordance with one or more metrics that measure nostalgia. Calculating such metrics and applying the results to personalize content gives media-providing services a sophisticated tool for improving user experience.

In accordance with some implementations, a method is performed at a server system of a media-providing service. The server system includes one or more processors and memory storing instructions for execution by the one or more processors. The method includes accessing a listening history of a user of the media-providing service, the user being in a demographic group. For each track of a plurality of tracks in the listening history of the user, a first metric is calculated based at least in part on an affinity of members of the demographic group, as compared to members of other demographic groups, for the track. The first metrics for the plurality of tracks in the listening history of the user are averaged to determine a second metric. In accordance with a determination that the second metric satisfies a threshold, content is selected for the user. The selected content is provided to a client device associated with the user.

In accordance with some implementations, a server system includes one or more processors and memory storing one or more programs configured to be executed by the one or more processors. The one or more programs include instructions for performing the operations of the method described above. In accordance with some implementations, a non-transitory computer-readable storage medium has stored therein instructions that, when executed by the server system, cause the server system to perform the operations of the method described above.

Thus, systems are provided with effective methods for personalizing content for users of a media-providing service.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings and specification.

FIGS. 2A-2C are flow diagrams illustrating methods for selecting content in accordance with some implementations.

DETAILED DESCRIPTION

Reference will now be made to implementations, examples of which are illustrated in the accompanying drawings. In the following description, numerous specific details are set forth in order to provide an understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are used only to distinguish one element from another. For example, a first metric could be termed a second metric, and, similarly, a second metric could be termed a first metric, without departing from the scope of the various described implementations. The first metric and the second metric are both metrics, but they are not the same metric.

The terminology used in the description of the various implementations described herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
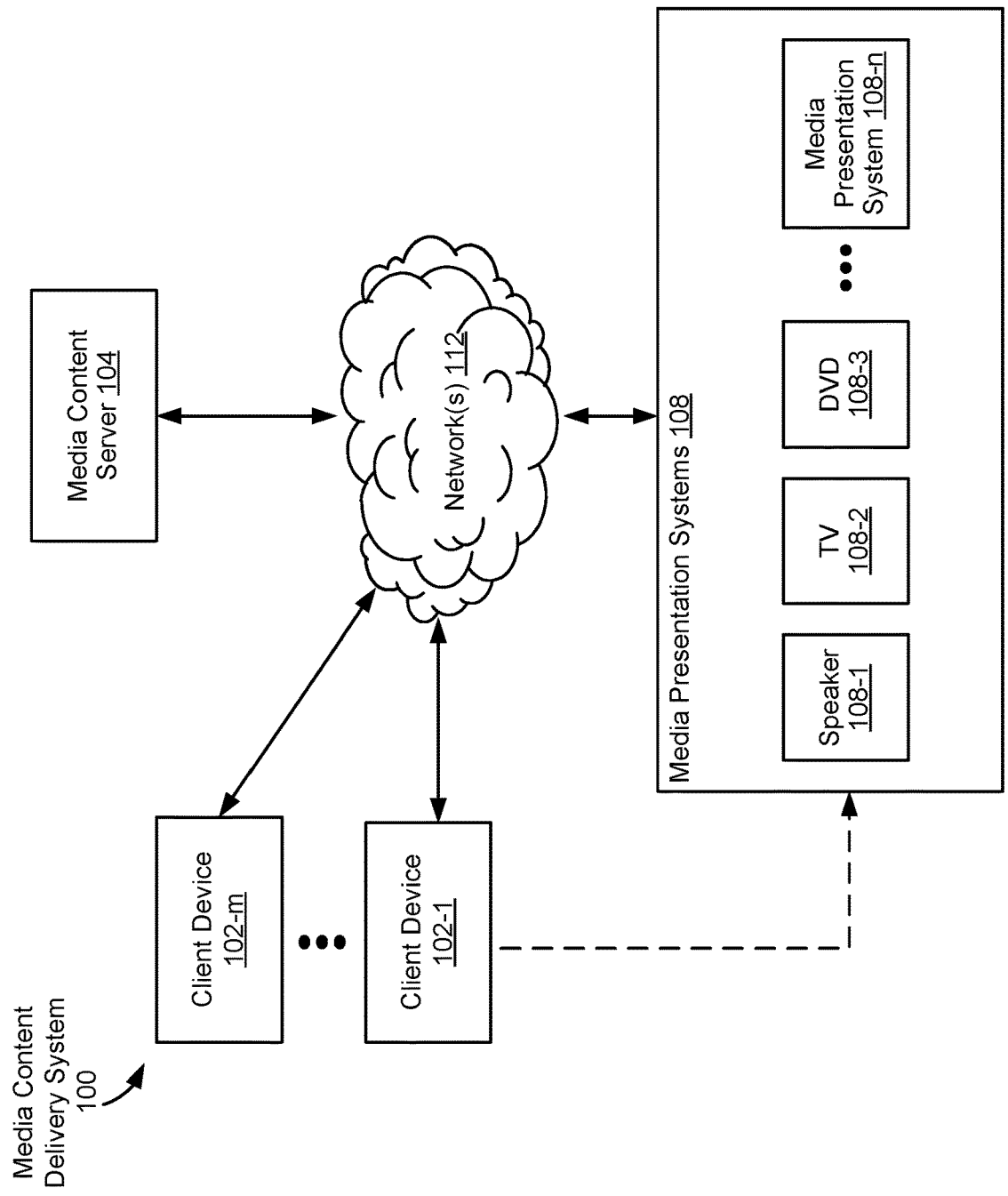
FIG. 1 is a block diagram illustrating a media content delivery system in accordance with some implementations.

FIG. 1 is a block diagram illustrating a media content delivery system 100 in accordance with some implementations. The media content delivery system 100 includes one or more client devices 102 (e.g., client device 102-1 to client device 102-m, where m is an integer greater than one), one or more media content servers 104, and one or more media presentation systems 108, including speaker 108-1, television (TV) 108-2, digital versatile disk (DVD) player 108-3, and/or other media presentation system 108-n (where n is an integer greater than three). The one or more media content servers 104 are associated with (e.g., at least partially compose) a media-providing service. One or more networks 112 communicably couple the components of the media content delivery system 100. In some implementations, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some implementations, a client device 102-1 or 102-m is associated with one or more users. In some implementations, a client device 102 is a personal computer, mobile electronic device, wearable computing device, laptop computer, tablet computer, mobile phone, feature phone, smart phone, digital media player, or any other electronic device capable of presenting media content (e.g., controlling playback of media items, such as music tracks, videos, etc.). A client device 102 may connect to a media presentation system 108 wirelessly or through a wired connection (e.g., directly through an interface, such as an HDMI interface). In some implementations, a client device 102 is a headless client. In some implementations, client devices 102-1 and 102-m are the same type of device (e.g., client device 102-1 and client device 102-m are both mobile devices). Alternatively, client device 102-1 and client device 102-m are different types of devices.

In some implementations, client devices 102-1 and 102-m send and receive media-control information through the networks 112. For example, client devices 102-1 and 102-m send media control requests (e.g., requests to play music, movies, videos, or other media items, or playlists thereof) to media content server 104 through network(s) 112. Additionally, client devices 102-1 and 102-m, in some implementations, also receive authentication tokens from the media content server 104 through network(s) 112.

In some implementations, client device 102-1 communicates directly with media presentation systems 108. As pictured in FIG. 1, client device 102-1 is able to communicate directly (e.g., through a wired connection or through a short-range wireless signal, such as those associated with personal-area-network (e.g., BLUETOOTH/BLE) communication technologies, radio-frequency-based near-field communication technologies, infrared communication technologies, etc.) with media presentation systems 108, while client device 102-m communicates with the media presentation systems 108 through network(s) 112. In some implementations, client device 102-1 uses the direct connection with media presentation systems 108 to stream content (e.g., data for media items) for playback on the media presentation systems 108.

In some implementations, client device 102-1 and client device 102-m each include a media application 322 (FIG. 3) that allows a user of the client device to browse, request (e.g., for playback at the client device 102 and/or a media presentation system 108), and/or present media content (e.g., control playback of music tracks, videos, etc.). Media content may be stored locally (e.g., in memory 312 of the client device 102, FIG. 3) and/or received in a data stream (e.g., from the media content server 104). The media presentation system 108 may be part of the client device 102, such as built-in speakers and/or a screen, or may be separate from the client device 102, such as a wirelessly coupled speaker (e.g., speaker 108-1).

In some implementations, the media content server 104 stores and provides media content (also referred to as media items) (e.g., media content requested by the media application 322 of client device 102-1 and/or 102-m) to client devices 102 and/or media presentation systems 108 via the network(s) 112. Content stored and served by the media content server 104, in some implementations, includes any appropriate content, including audio (e.g., music, spoken word, podcasts, etc.), videos (e.g., short-form videos, music videos, television shows, movies, clips, previews, etc.), text (e.g., articles, blog posts, emails, etc.), images (e.g., photographs, drawings, renderings, etc.), games (e.g., 2- or 3-dimensional graphics-based computer games, etc.), or any combination of content types (e.g., web pages that include any combination of the foregoing types of content or other content not explicitly listed). Audio media items (i.e., audio items) may be referred to as tracks. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to other servers and/or server systems, or other devices, such as other client devices, databases, content delivery networks (e.g., peer-to-peer networks), network caches, and the like. In some implementations, the media content server 104 is implemented by multiple computing devices working together to perform the actions of a server system (e.g., cloud computing).

As described above, media presentation systems 108 (e.g., speaker 108-1, TV 108-2, DVD 108-3, media presentation system 108-n) are capable of receiving media content (e.g., from the media content server 104) and presenting the received media content. For example, speaker 108-1 may be a component of a network-connected audio/video system (e.g., a home entertainment system, a radio/alarm clock with a digital display, or an infotainment system of a vehicle). In some implementations, the media content server 104 sends media content to the media presentation systems 108. For example, media presentation systems 108 include computers, dedicated media players, network-connected stereo and/or speaker systems, network-connected vehicle media systems, network-connected televisions, network-connected DVD players, and universal serial bus (USB) devices used to provide a playback device with network connectivity, and the like.

Content provided to a media presentation system 108 may be personalized for a respective user (e.g., a user of a client device 102) based on one or more metrics that quantify nostalgia. For example, a nostalgia metric is calculated, based on a track-demographic relationship, which captures how nostalgic a track is for a given demographic group. This metric is then aggregated to produce a nostalgia value for a user based on their demographic characteristics and their listening history.

Nostalgia is a feeling that may encapsulate the feeling and historical context of growing up in a given place and time. Songs from a given place and/or time may constitute a common cultural substrate shared between people of a common demographic group (e.g., of a common generation and/or background), uniting members of the demographic group and setting them apart from other demographic groups. A metric that quantifies nostalgia may reflect a degree of reminiscence, such that a time period (e.g., year) for a song and the relationship of that time period to the age of the user contributes to the metric. The metric may reflect generational identity (and/or some other sense of demographic identity), which may be captured for a particular user by looking at a user's demographic information (e.g., age and/or gender, as specified for example in a user profile stored by the media-providing service).

A probability P(Y) is defined as the probability of a user listening to a song released in year Y. This probability likely includes a recency bias, which is expected to be a common trend across age groups. To examine differences between age groups, a probability P(Y\A) is defined as the probability of a user of age A listening to a song from (e.g., released in) year Y.

In some embodiments, the relative magnitude of departure in listening behavior for a particular age group, as compared to other age groups, can be tracked by the ratio between the probability for a given age and the general probability, that is P(Y\A)/P(Y). This magnitude of departure may be referred to as over-indexing. However, using P(Y) as the baseline for this comparison (i.e., as the denominator) is highly sensitive to the specific distribution of ages for the media-providing service, as well as how active on the media-providing service people of different ages are. The influence of these idiosyncrasies may be mitigated by defining the baseline as the average across ages (e.g., all ages) of the age-specific distributions P(Y\A). A release-year over-indexing metric thus may be defined as:

$$OI^y(Y \mid A) = \log\left(\frac{P(Y \mid A)}{\frac{\Sigma_x P(Y \mid A = x)}{\Sigma_x 1}}\right) \quad (1)$$

where the variable of the summation x runs over all ages considered. The ages considered may be capped at the lower and/or upper ends. In this way, the users of each age contribute to the baseline equally, regardless of their inherent level of activity and their representation on the media-providing service. The release-year over-indexing metric provides a measure of the affinity of members of an age group, as compare to members of other age groups, for tracks (e.g., music) from a given year.

To personalize content based on nostalgia, however, it is desirable not merely to identify tracks that belong to a specific era, but also to identify tracks that are significant for a given generation associated with the era. In some embodiments, the technique used in equation 1 may describe track over indexing. In some embodiments, a probability P(T) is defined as the probability of a user listening to a given track T, and a probability P(T\A) is defined as the probability of a user listening to that track given that the user is of age A. A track over-indexing metric, which quantifies the affinity of a particular age group for an individual track as compared to other age groups, may then be defined as:

$$OI^t(T \mid A) = \log\left(\frac{P(T \mid A)}{\frac{\Sigma_x P(T \mid A = x)}{\Sigma_x 1}}\right) \quad (2)$$

Using the metrics of equations 1 and 2, a nostalgia metric may then be defined that reflects both whether a track is important to a given age group and whether the track is from a year (e.g., its year of release) that is important to the given age group. These conditions are met when, for a song T from year Y, both $OI^y$ and $OI^t$ are positive for age A. Furthermore, the larger both of these values are, the stronger we expect the nostalgic connection between the age group and the song to be. In some embodiments, a nostalgia metric for a track and an age may thus be defined as:

$$N_A(T) = OI^y(Y \mid A) \times OI^t(T \mid A) \times \Theta(OI^y(Y \mid A)) \times \Theta(OI^t(T \mid A)) \quad (3)$$

where Y is the track's year (e.g., release year) and $\Theta$ is the Heaviside step function, which is 0 if the argument is less than or equal to 0, and 1 otherwise. Equation 3 is merely one example of how to generate a nostalgia metric using both $OI^y$ and $OI^t$. Other suitable mathematical techniques could be used to generate the nostalgia metric. For example, the nostalgia metric could include a first term based on $OI^y$ and a second term based on $OI^t$, with the two terms being suitably weighted and then added together. In some embodiments, additional or alternative features related to the songs (e.g., metrics related to year of release, genre preference of the user, recency of play, etc.) may be included in defining the nostalgia metric. In some embodiments, linear and or logistic regression or random forest models can be used in combination with or alternatively to the over-indexing metrics.

In some embodiments, a measure of a degree of nostalgia for a user can be calculated by applying the nostalgia metric of equation 3 (or alternatively, of equation 1 or 2) to tracks from the user's listening history (e.g., by averaging the nostalgia metric across the tracks). If, over a given time window, a user U of age A has listened to tracks $\{T_1, T_2, \ldots, T_L\}$, then a user-level nostalgia metric can be defined as $$N_U = \frac{1}{L}\sum_{i=1}^{L} N_A(T_i) \quad (4)$$

Equation 4, which determines the mean nostalgia metric for tracks from the user's listening history, is one example of how to determine a user-level nostalgia metric. Other examples may include determining a median or weighted average of nostalgia metrics for tracks from the user's listening history.

Similar metrics to the metrics of equations 1-4 may be defined for other demographic groups besides those based solely on age. In some embodiments, such metrics may be defined for demographic groups defined based on a single demographic variable besides age, or for compound demographic groups defined based on multiple demographic variables (e.g., age plus one or more other demographic variables). For example, gender may be included as part of the over-indexing calculations:

$$OI'(Y|A) \to OI'(Y|A,G)$$

$$OI'(T|A) \to OI'(T|A,G)$$

where A is age, G is gender, and the baseline is derived by including gender categories as another variable in the summations. Furthermore, different versions of the over-indexing metrics may be calculated for different demographic groups (e.g., for different geographical regions, such as countries).

In some embodiments in which age is one of the demographic variables, the denominator of the release-year over-indexing metric is modified to account for the asymmetry and directionality of age. For example, youth mostly listen to current music as compared to older users and thus will have very high over-indexing values for recent release years. To account for this fact, the release-year over-indexing metric is defined such that the summations in the denominator are capped at the age of the user:

$$OI'(Y|A) \to OI'(Y|A) = \log\left(\frac{P(Y|A)}{\frac{\Sigma_x^A P(Y|a=x)}{\Sigma_x^A 1}}\right) \quad (5)$$

In equation 1, by contrast, the summation may be over the full range of ages for users of the media-providing service, or over a capped range of ages for users of the media-providing service.

Determining the year of a track presents challenges. Multiple tracks may exist corresponding to the same song (e.g., tracks from the original album, compilations, live versions, etc.). In some embodiments, all tracks are mapped to their corresponding canonical recording. For example, for every track for a given song, the year for every track of a given song is designated as the earliest release year among all tracks for the song. Alternatively, tracks corresponding to different versions of the same song are assigned their respective release years. Furthermore, another year besides release year (e.g., the year when a track reached its highest ranking on the charts) may be used as the track year in calculating the above metrics.

In some embodiments, when calculating P(Y), streams are not used as the unit of measurement. Instead, for example, unique (user, canonical recording) pairs are used to calculate P(Y). This choice avoids distortion from streams in which a track is left on repeat.

In some embodiments, tracks that a user played in response to a recommendation from the media-providing service are excluded in calculating the above metrics, to ensure the precondition of choice on the part of the user.

In some embodiments, the over-indexing metrics (e.g., of equations 1 and 2 or of or 5 and 2) are calculated over a first time window and the user-level nostalgia metric (e.g., of equation 4) is calculated over a second time window that is shorter than the first time window. The time windows may be rolling (i.e., sliding) windows. In one example, the over-indexing metrics are calculated using a three-month window and the user-level nostalgia metric is calculated daily using a 30-day (or one-month) window.

In some embodiments, tracks that do not satisfy a popularity threshold are disregarded when calculating the over-indexing metrics. This popularity threshold may be applied across all considered demographic groups. In one example, the song is excluded only if it fails to satisfy the popularity metric for every group (e.g., for every age, or every combination of age and gender). In one example, tracks for which $P(T|A, G) < 1 \times 10^{-7}$ for all ages and genders considered are disregarded.

Figure 2B:
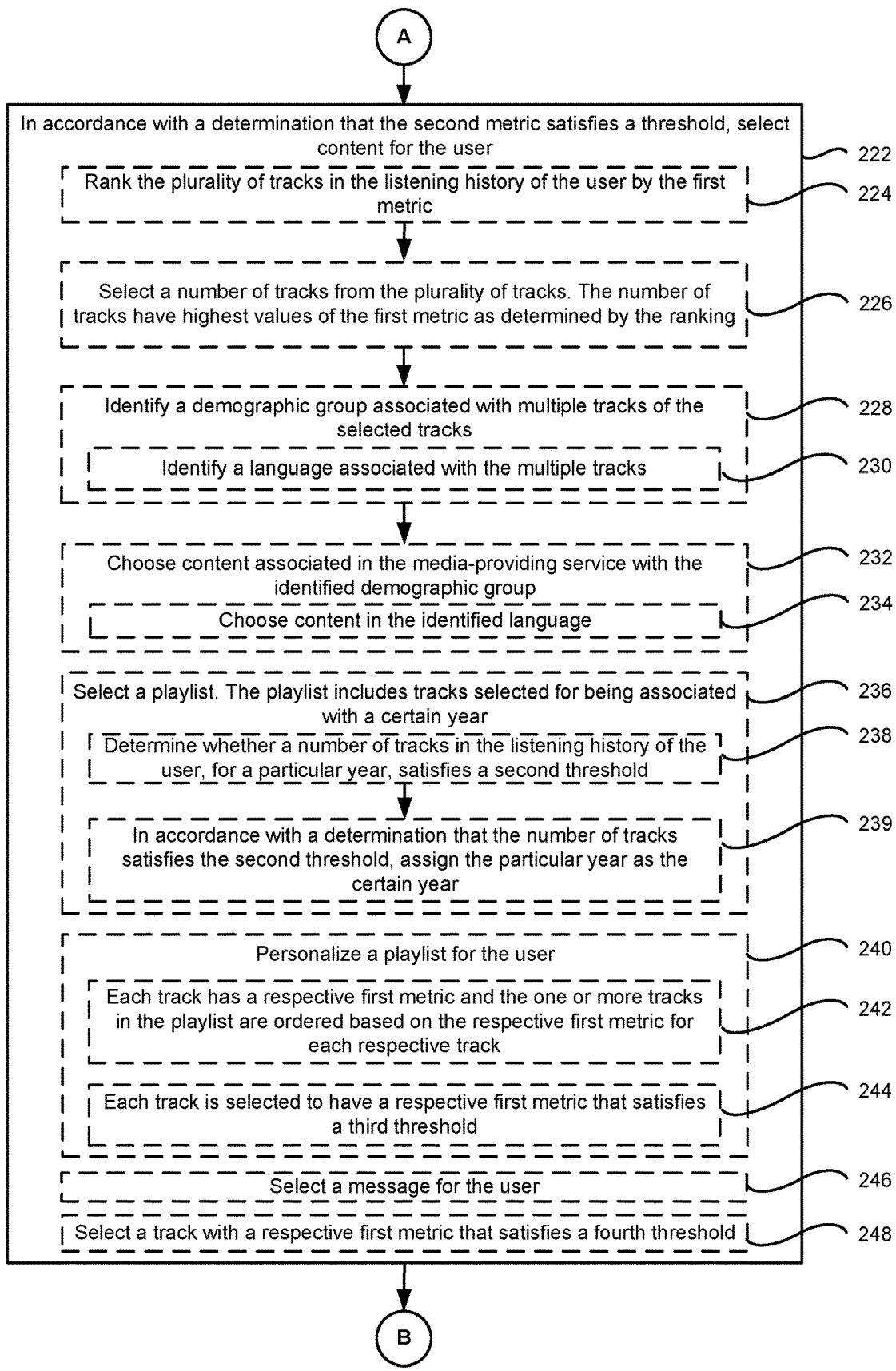
Figure 2C:
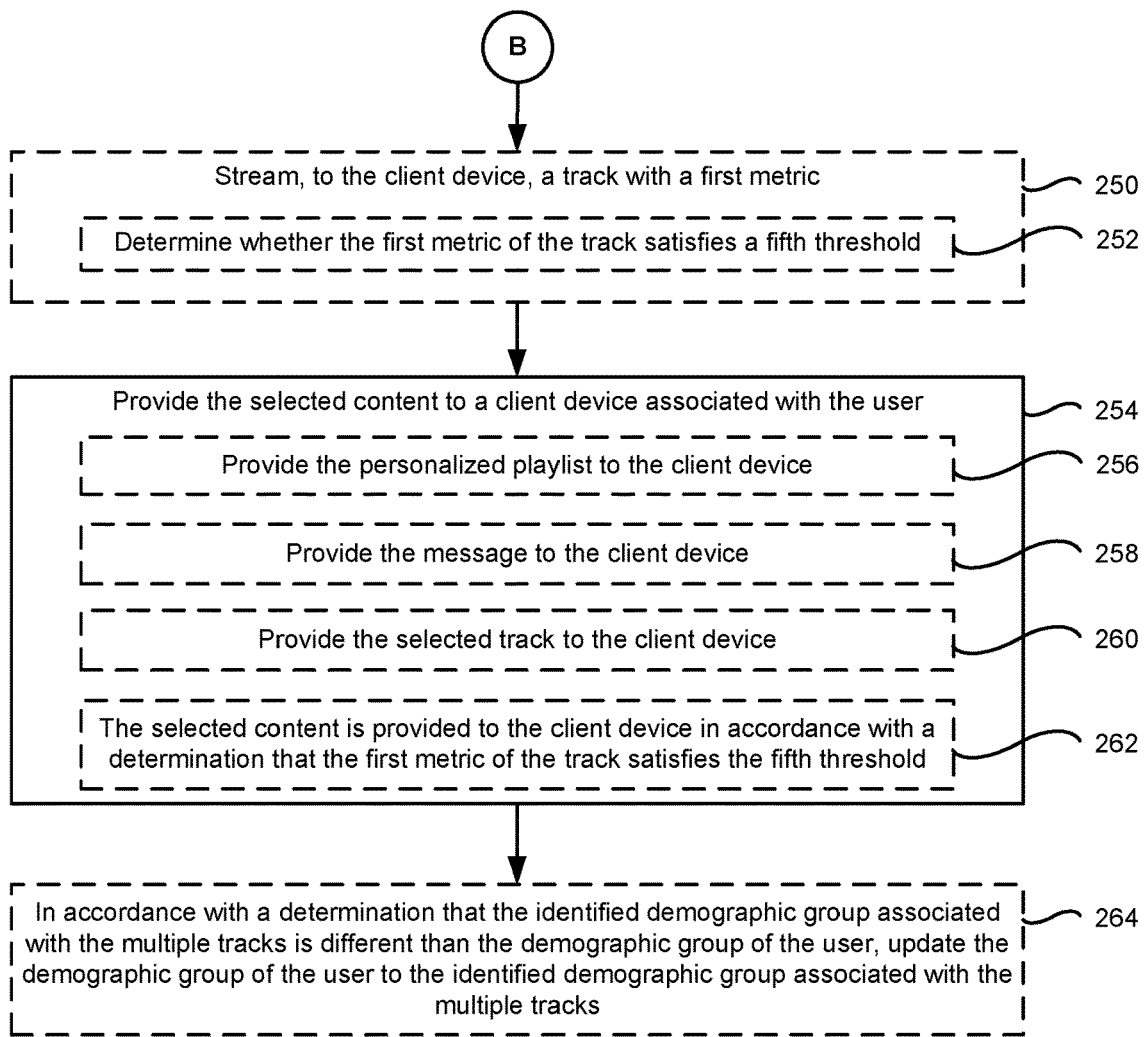

FIGS. 2A-2C are flow diagrams illustrating a method 200 for selecting content for a client device associated with a user, in accordance with some implementations. Method 200 may be performed (202) at a server system (e.g., media content server 104, FIGS. 1 and 4) having one or more processors and memory storing instructions for execution by the one or more processors. The server system is associated with a media-providing service, (e.g., provides media content for playback to client devices 102 and/or media presentation systems 108 in a media content delivery system 100). In some implementations, the method 200 is performed by executing instructions stored in the memory of a server system (e.g., in memory 406, FIG. 4). In some implementations, the method 200 is performed by a combination of the server system and a client device (e.g., operation 222 may be performed by the client device).

Referring now to FIG. 2A, in performing the method 200, the server system accesses (204) a listening history of a user of the media-providing service. The user is in a demographic group (e.g., based on a user profile). The listening history is for (206) a period of time preceding the current time (e.g., a sliding window). For example, the listening history may include the user's requests for tracks from the past week, the past month, the past several months, or the past year or more.

In some embodiments, the server system determines (208) a year associated with the track for each track in the listening history of the user. For example, a release year of a track or corresponding canonical recording may be the year associated with the track. A year in which the track became popular (e.g., was featured on, debuted on, or peaked on a top chart) may also be assigned as the year associated with the track.

For each of the tracks in the user's listening history, the server system calculates (210) a first metric (e.g., equation 2 or 3) based at least in part on an affinity of the members of the demographic group, as compared to members of other demographic groups, for the track. For example the first metric may reflect the likelihood that a user of a first demographic group (e.g., a certain age) will listen to and/or enjoy a track (e.g., request the media item from the server system) compared to the likelihood that one or more users in other demographic groups (e.g., users not of the certain age) will listen to and/or enjoy the track. In some embodiments, the first metric (e.g., equation 3) is also based (214) on an affinity of the members of the demographic group, compared to the members of the other demographic groups, for music from the year associated with the track. For example, the first metric is based on the likelihood a certain demographic group has an affinity for a certain track as well as on the likelihood a certain demographic group has an affinity for any music (e.g., tracks) that shares the year associated with the track.

In some embodiments, the demographic group includes (214) members with ages within a particular age range and the other demographic groups include members with ages that are not within the particular age range. For example, the members of the other demographic groups have ages that are included within age ranges that are distinct from the particular age range (e.g., the age range of the user). The age range of each demographic group thus may be distinct (e.g., non-overlapping). In some embodiments, the demographic group includes (216) members of a particular country and the other demographic groups include members of one or more countries that are not the particular country. The demographic groups thus may correspond to distinct countries. In some embodiments, the demographic group includes (218) members of a particular gender and the other demographic groups include members of one or more genders that are not the particular gender. The demographic groups thus may correspond to distinct genders. The demographic groups may alternately correspond to distinct combinations of demographic variables (e.g., age, gender, and/or country).

The server system averages (220) the first metrics for the plurality of tracks in the listening history of the user to determine a second metric. An average may include a mean, a median, or any weighted average that aggregates the first metrics.

Referring to FIG. 2B, the server system selects (222) content for the user in accordance with a determination that the second metric satisfies a threshold. The threshold may be predefined, and may be reset or redefined by the server system. The threshold corresponds to an indication that a user's listening history evidences nostalgic tendencies. Referring to FIG. 2C, the server system provides (254) the selected content to a client device associated with the user.

In some embodiments, to select the content, the server system ranks (224, FIG. 2B) the plurality of tracks in the listening history of the user by the first metric. The server system selects (226) a number (e.g., a predefined number; an arbitrary number above a threshold) of tracks from the plurality of tracks (e.g., a subset of the plurality of tracks). The predefined number of tracks have highest values of the first metric as determined by the ranking. For example, the server system will create a ranked list where the order starts at the track(s) with the highest value of the first metric and ends with the track(s) with the lowest value of the first metric. In some embodiments, the server system identifies (228) a demographic group (e.g., a country, a language, etc.) associated with multiple tracks of the selected tracks and chooses (232) content associated in the media-providing service with the identified demographic groups. For example, the server system may identify (230) a language associated with the multiple tracks and then may choose (234) content in the identified language to provide (e.g., recommend or otherwise make available) to the user.

In some embodiments, in accordance with a determination that the identified demographic group associated with the multiple tracks is different than the demographic group of the user, the demographic group of the user is updated (264, FIG. 2C) to the identified demographic group associated with the multiple tracks. For example, the server system updates the user profile accordingly.

In some embodiments, the server selects (236) a playlist. The playlist includes tracks selected for being associated with a certain year. For example, a "time-hop" playlist may be selected such that a plurality of tracks associated with a given year (or a range of years) is included in the playlist. Thus, a user can "time-hop" to a playlist associated with a specific year or decade (e.g., '80's playlist, hits from 2012 playlist, etc.). In some embodiments, to select which tracks are included in the playlist, the server system may determine (238) whether a number of tracks in the listening history of the user, for a particular year (or other time period), satisfies a second threshold. For example, the server system may determine whether the user has listened to a second threshold number of songs from a certain year. By satisfying the second threshold, the user's listening history may indicate that the user generally listens to and/or enjoys tracks from a certain year. In some embodiments, in accordance with a determination that the number of tracks in the listening history of the user, for a particular year, satisfies the second threshold, the server system assigns (239) the particular year as the certain year for the playlist (e.g., the tracks included in the playlist are selected as being from the particular year).

In some embodiments, the server system personalizes (240) a playlist for the user as the selected content for the user. In some embodiments, the playlist has one or more tracks and each track has a respective first metric. The one or more tracks in the playlist may be ordered (242) based on the respective first metric for each respective track (e.g., ordering the tracks in descending order of the respective first metrics, with the highest respective first metrics at the beginning of the playlist). In some embodiments, each track is selected (244) to have a respective first metric that satisfies a third threshold. For example, a first metric that is greater than a predefined threshold may indicate a user has a nostalgic preference for that track. Thus, the playlist may only include tracks with respective first metrics that indicate a user's likely nostalgic preference for the tracks (e.g., the first metric satisfies the third threshold). The playlist provides (256) the personalized playlist to the client device.

In some embodiments, the server system selects (246) a message for the user. The server system provides (258) the message to the client device. In some embodiments, the message is an advertisement. In some embodiments, the message is identified as an effective (e.g., popular or well-received) message for a particular demographic group. For example, a message (e.g., advertisement or recommendation) may be selected for presentation to a first demographic group (e.g., users with a certain age and/or gender). In some embodiments, the message is not presented (e.g., the server system forgoes presenting) to members not in the first demographic group (e.g., members who are not the certain age and/or gender).

In some embodiments, the server system selects (248) a track with a respective first metric that satisfies a fourth threshold. Satisfying the fourth threshold may indicate that the user is likely to have a nostalgic preference for the selected track. The server system provides (260) the selected track to the client device.

In some embodiments, the server system streams (250, FIG. 2C) a track, which has a first metric, to the client device. The server system determines (252) whether the first metric of the track satisfies a fifth threshold. In some embodiments, the selected content (e.g., the selected track) is provided (262) to the client device in accordance with a determination that the first metric of the track satisfies a fifth threshold. In some embodiments, the selected content is provided to the client device while the server system streams the track. In some embodiments, the selected content is provided to the client device while the server system is not streaming the track (e.g., between streaming one or more tracks) (e.g., once the server system finishes streaming the track and before the server system begins to stream another track). In some embodiments, the fourth threshold and the fifth threshold are the same (e.g., equivalent in value). In some embodiments, the fourth threshold and the fifth threshold are distinct.

Although FIGS. 2A-2C illustrate a number of logical stages in a particular order, stages which are not order dependent may be reordered and other stages may be combined or broken out. For example, selecting content for the user may be performed without averaging the first metrics to determine a second metric and without determining whether the second metric satisfies a threshold. Similarly, the selected content may be provided to a client device associated with the user without determining the second metric and without a determination that the second metric satisfies a threshold.

While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software, or any combination thereof.

Figure 3:
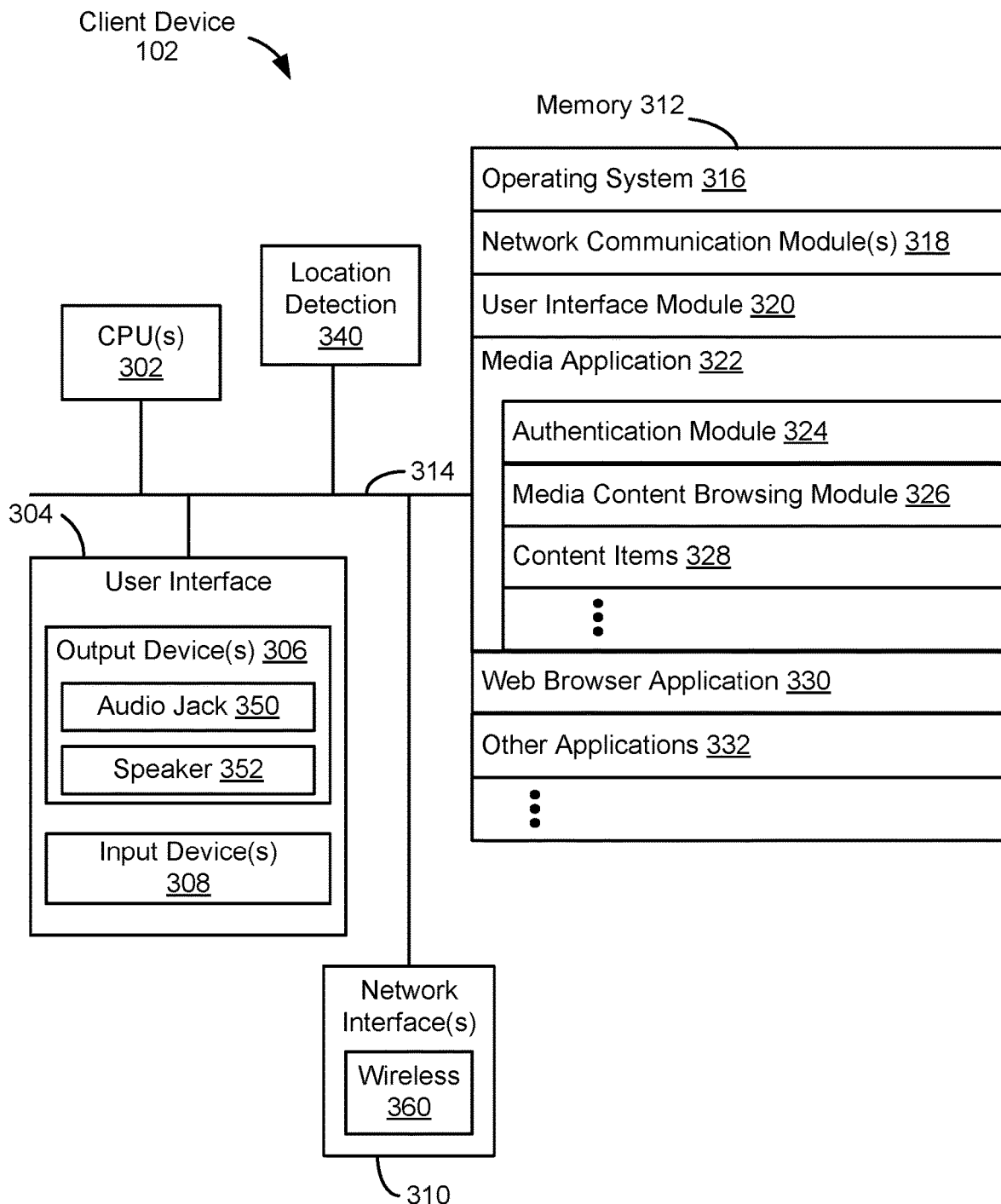
FIG. 3 is a block diagram illustrating a client device in accordance with some implementations.

FIG. 3 is a block diagram illustrating a client device 102 (e.g., client device 102-1 and/or client device 102-m, FIG. 1) in accordance with some implementations. The client device 102 includes one or more central processing units (CPU(s), i.e., processors or cores) 302, one or more network (or other communications) interfaces 310, memory 312, and one or more communication buses 314 for interconnecting these components. The communication buses 314 optionally include circuitry (sometimes called a chipset) that interconnects and controls communications between system components.

As also shown in FIG. 3, the client device 102 includes a user interface 304, including output device(s) 306 and input device(s) 308. In some implementations, the input devices 308 include a keyboard, mouse, or track pad. Alternatively, or in addition, in some implementations, the user interface 304 includes a display device that includes a touch-sensitive surface, in which case the display device is a touch-sensitive display. In client devices that have a touch-sensitive display, a physical keyboard is optional (e.g., a soft keyboard may be displayed when keyboard entry is needed). The output devices (e.g., output device(s) 306) include a speaker 352 (e.g., speakerphone device) and/or an audio jack 350 (or other physical output connection port) for connecting to speakers, earphones, headphones, or other external listening devices. Furthermore, some client devices 102 use a microphone and voice recognition device to supplement or replace the keyboard. Optionally, the client device 102 includes an audio input device (e.g., a microphone) to capture audio (e.g., speech from a user).

Optionally, the client device 102 includes a location-detection device 340, such as a global navigation satellite system (GNSS) (e.g., GPS (global positioning system), GLONASS, Galileo, BeiDou) or other geo-location receiver, and/or location-detection software for determining the location of the client device 102 (e.g., module for finding a position of the client device 102 using trilateration of measured signal strengths for nearby devices).

In some implementations, the one or more network interfaces 310 include wireless and/or wired interfaces for receiving data from and/or transmitting data to other client devices 102, media presentations systems 108, a media content server 104, and/or other devices or systems. In some implementations, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some implementations, data communications are carried out using any of a variety of custom or standard wired protocols (e.g., USB, Firewire, Ethernet, etc.). For example, the one or more network interfaces 310 include a wireless interface 360 for enabling wireless data communications with other client devices 102, media presentations systems 108, and/or or other wireless (e.g., Bluetooth-compatible) devices (e.g., for streaming audio data to the media presentations system 108 of an automobile). Furthermore, in some implementations, the wireless interface 360 (or a different communications interface of the one or more network interfaces 310) enables data communications with other WLAN-compatible devices (e.g., a media presentations system 108) and/or the media content server 104 (via the one or more network(s) 112, FIG. 1).

In some implementations, client device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 312 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 312 may optionally include one or more storage devices remotely located from the CPU(s) 302. Memory 312, or alternately, the non-volatile memory solid-state storage devices within memory 312, includes a non-transitory computer-readable storage medium. In some implementations, memory 312 or the non-transitory computer-readable storage medium of memory 312 stores the following programs, modules, and data structures, or a subset or superset thereof:

- an operating system 316 that includes procedures for handling various basic system services and for performing hardware-dependent tasks;
- network communication module(s) 318 for connecting the client device 102 to other computing devices (e.g., media presentation systems 108, media content server 104, and/or other client devices) via the one or more network interface(s) 310 (wired or wireless) connected to one or more network(s) 112;
- a user interface module 320 that receives commands and/or inputs from a user via the user interface 304 (e.g., from the input devices 308) and provides outputs for playback and/or display on the user interface 304 (e.g., the output devices 306);
- a media application 322 (e.g., an application associated with and for accessing a media-providing service provided by a media content provider such as media content server 104, including a media player, a streaming media application, or any other appropriate application or component of an application) for browsing, receiving, processing, presenting, and requesting playback of media (e.g., media items). The media application 322 may also be used to monitor, store, and/or transmit (e.g., to media content server 104) data associated with user behavior. The media application 322 also includes the following modules (or sets of instructions), or a subset or superset thereof:
  - an authentication module 324 for sending authentication tokens corresponding to one or more media presentation systems associated with the client device 102 (e.g., one or more of the media presentation systems 108 from FIG. 1), receiving authentication tokens from other devices, and/or generating authentication tokens for media presentation systems associated with client device 102;

a media content browsing module 326 for providing controls and/or user interfaces enabling a user to navigate, select for playback, and otherwise control or interact with media content, whether the media content is stored or played locally or remotely;

a content items module 328 storing media items for playback;

a web browser application 330 (e.g., Internet Explorer or Edge by Microsoft, Firefox by Mozilla, Safari by Apple, or Chrome by Google) for accessing, viewing, and interacting with web sites; and other applications 332, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

In some implementations, the media presentation system 108 is a type of client device 102, and includes some or all of the same components, modules, and sub-modules as described above in FIG. 3 with respect to the client device 102.

Figure 4:
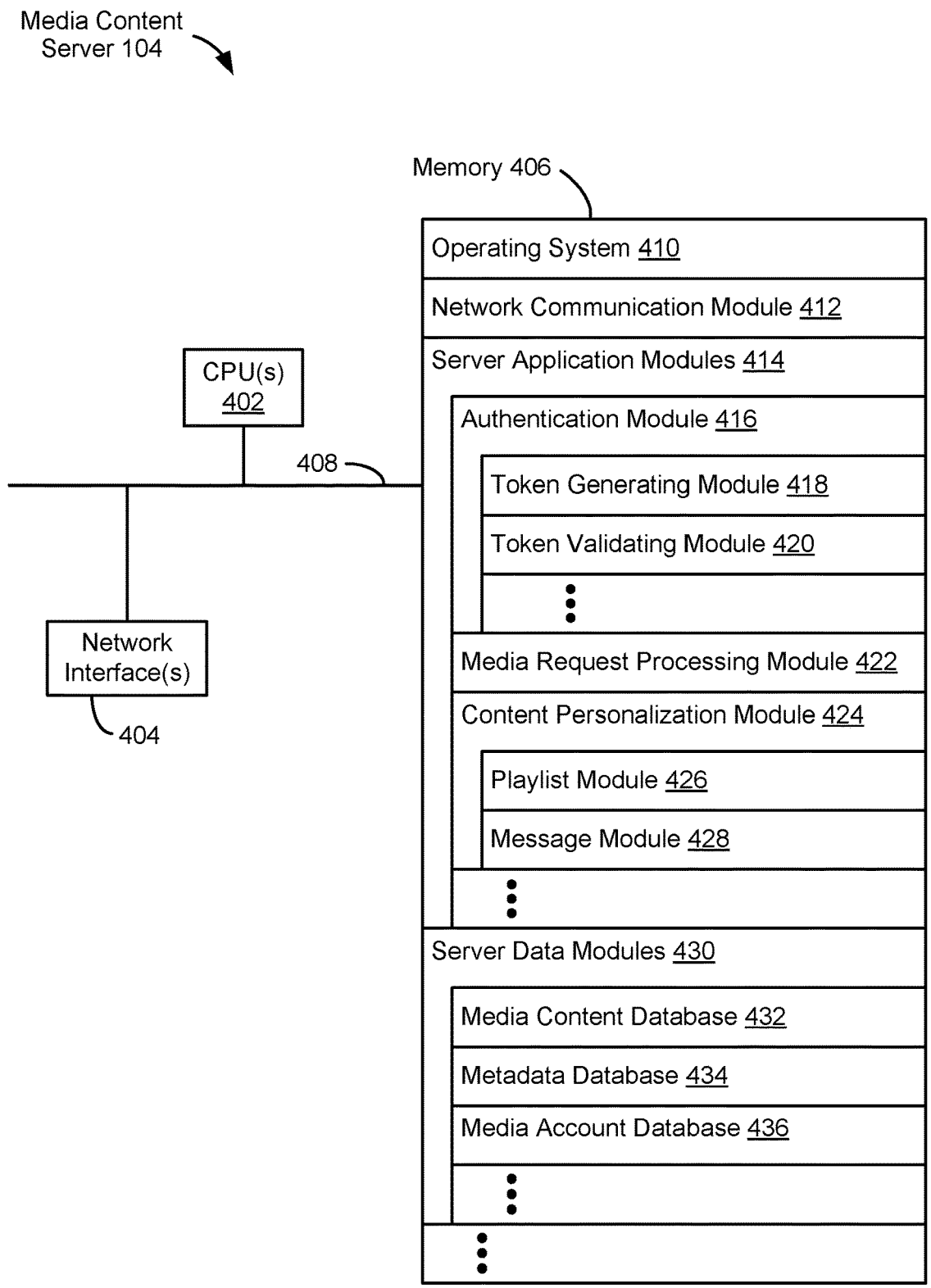
FIG. 4 is a block diagram illustrating a media content server in accordance with some implementations.

FIG. 4 is a block diagram illustrating a media content server 104 in accordance with some implementations. The media content server 104 typically includes one or more central processing units/cores (CPUs) 402, one or more network interfaces 404, memory 406, and one or more communication buses 408 for interconnecting these components.

Memory 406 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 406, optionally, includes one or more storage devices remotely located from one or more CPUs 402. Memory 406, or, alternatively, the non-volatile solid-state memory device(s) within memory 406, includes a non-transitory computer-readable storage medium. In some implementations, memory 406, or the non-transitory computer-readable storage medium of memory 406, stores the following programs, modules and data structures, or a subset or superset thereof:

an operating system 410 that includes procedures for handling various basic system services and for performing hardware-dependent tasks;

a network communication module 412 that is used for connecting the media content server 104 to other computing devices via one or more network interfaces 404 (wired or wireless) connected to one or more networks 112;

one or more server application modules 414 for performing various functions with respect to providing and managing a content service, the server application modules 414 including, but not limited to, one or more of:

an authentication module 416 for managing authentication and/or authorization requests, the authentication module 416 including, but not limited to, one or more of:

a token generating module 418 for generating authentication tokens permitting use of media presentation systems 108; and a token validating module 420 for verifying that an authentication token is valid (e.g., has not yet expired or has not yet been revoked); and a media request processing module 422 for processing requests for media content and facilitating access to requested media items by client devices (e.g., the client device 102) including, optionally, streaming media content to such devices and/or to one or more media presentation systems 108;

a content personalization module 424 for providing personalized content (e.g., playlists, tracks, advertisements, tooltips, notifications, etc.) to users of the content service, including, but not limited to, one or more of:

a playlist module 426 for processing (e.g., selecting and/or generating) and storing data (e.g., playlists and/or tracks) for selecting content based on one or more metrics; and a message module 428 for processing (e.g., selecting and/or generating) messages (e.g., advertisements and/or recommendations) to be provided to the user;

one or more server data module(s) 430 for handling the storage of and access to media items and metadata relating to the media items; in some implementations, the one or more server data module(s) 430 include:

a media content database 432 for storing media items (e.g., audio files, video files, text files, etc.);

a metadata database 434 for storing metadata relating to the media items; and a media account database 436 for storing account information for user media accounts, including user profiles (e.g., demographic groups), credentials (e.g., user identifiers, passwords, email addresses, etc.), credentials or identifiers of any linked accounts, and the like.

The memory 406 (e.g., the content personalization module 424) may include instructions for performing the method 200 (FIGS. 2A-2C) or a portion thereof.

In some implementations, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 312 and 406 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various implementations. In some implementations, memory 312 and 406 optionally store a subset or superset of the respective modules and data structures identified above. Furthermore, memory 312 and 406 optionally store additional modules and data structures not described above.

Although FIG. 4 illustrates the media content server 104 in accordance with some implementations, FIG. 4 is intended more as a functional description of the various features that may be present in one or more media content servers than as a structural schematic of the implementations described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement the media content server 104, and how features are allocated among them, will vary from one implementation to another and, optionally, depends in part on the amount of data traffic that the server system handles during peak usage periods as well as during average usage periods.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method, comprising at a server system of a media-providing service having one or more processors and memory storing instructions for execution by the one or more processors:
    accessing a profile of a user of the media-providing service, the profile of the user indicating a demographic group of the user;
    for each track of a plurality of tracks, determining a year associated with the track; and
    selecting content for the user, including selecting a respective track, based at least in part on an affinity of members of the demographic group, as compared to members of other demographic groups, for music from the year associated with the respective track; and
    providing the respective track to a client device associated with the user.

2. The method of claim 1, wherein selecting the content for the user comprises selecting a playlist that includes tracks from the same year as the respective track.

3. The method of claim 1, wherein:
    selecting the content for the user comprises personalizing a playlist for the user; and
    providing the selected content to the client device associated with the user comprises providing the personalized playlist to the client device.

4. The method of claim 1, further comprising:
    for each track of the plurality of tracks, calculating a first metric that represents the affinity of members of the demographic group, as compared to members of other demographic groups, for music form the year associated with the track; and
    averaging the first metrics for the plurality of tracks to determine a second metric, wherein selecting the content for the user is performed in accordance with a determination that the second metric satisfies a first threshold.

5. The method of claim 4, wherein the first metric is calculated for tracks played during a first time window and the second metric is calculated for tracks played during a second time window.

6. The method of claim 5, wherein the first time window and the second time window are rolling time windows.

7. The method of claim 4, wherein:
    selecting the content for the user in accordance with the determination that the second metric satisfies the first threshold comprises selecting a message for the user in accordance with the determination that the second metric satisfies the first threshold; and
    providing the selected content to the client device associated with the user comprises providing the message to the client device.

8. The method of claim 4, wherein the first metric comprises a release-year over-indexing metric based on an affinity of the members of the demographic group, as compared to the members of the other demographic groups, for music from the year associated with the track.

9. The method of claim 4 wherein the first metric comprises a track over-indexing metric based on an affinity of the members of the demographic group as compared to the members of the other demographic groups for a respective track.

10. The method of claim 9, wherein the first metric comprises a weighted combination of the track over-indexing metric and a release-year over-indexing metric corresponding to an affinity of the members of the demographic group, as compared to the members of the other demographic groups, for music from the year associated with the track.

11. The method of claim 1, wherein selecting the content for the user comprises:
    ranking the plurality of tracks based on an affinity of members of the demographic group, as compared to members of other demographic groups, of music from the year associated with the track;
    selecting a predefined number of tracks from the plurality of tracks, the predefined number of tracks having highest rankings;
    identifying a demographic group associated with multiple tracks of the selected tracks; and
    choosing content associated in the media-providing service with the identified demographic group;
    wherein providing the selected content comprises providing the chosen content to the client device associated with the user.

12. The method of claim 11, wherein:
    identifying the demographic group comprises identifying a language; and
    choosing the content associated in the media-providing service with the identified demographic group comprises choosing, by the server system, content in the identified language.

13. The method of claim 11, further comprising, at the server system:
    in accordance with a determination that the identified demographic group associated with the multiple tracks is different than the demographic group of the user, updating the demographic group of the user to the identified demographic group associated with the multiple tracks.

14. The method of claim 1, wherein determining the year associated with the track comprises determining a year the track was released.

15. The method of claim 1, wherein:
the demographic group includes members with ages within a particular age range; and
the other demographic groups include members with ages that are not within the particular age range.

16. The method of claim 1, wherein:
the demographic group includes members of a particular country; and
the other demographic groups include members of one or more countries that are not the particular country.

17. The method of claim 1, wherein:
the demographic group includes members of a particular gender; and
the other demographic groups include members of one or more genders that are not the particular gender.

18. The method of claim 1, wherein plurality of tracks are in a listening history of the user, the listening history including tracks associated with a period of time preceding a current time.

19. A server system associated with a media-providing service, comprising:
one or more processors; and
memory storing one or more programs for execution by the one or more processors, the one or more programs including instructions for:
accessing a profile of a user of the media-providing service, the profile of the user indicating a demographic group of the user;
for each track of a plurality of tracks, determining a year associated with the track; and
selecting, by the server system, content for the user, based at least in part on an affinity of members of the demographic group, as compared to members of other demographic groups, of music from the year associated with the track; and
providing the selected content to a client device associated with the user.

20. A non-transitory computer-readable storage medium, storing one or more programs for execution by one or more processors of a server system associated with a media-providing service, the one or more programs including instructions for:
accessing a profile of a user of the media-providing service, the profile of the user indicating a demographic group of the user;
for each track of a plurality of tracks, determining a year associated with the track; and
selecting, by the server system, content for the user, based at least in part on an affinity of members of the demographic group, as compared to members of other demographic groups, of music from the year associated with the track; and
providing the selected content to a client device associated with the user.

\* \* \* \* \*

UNITED STATES PATENT AND TRADEMARK OFFICE
CERTIFICATE OF CORRECTION

PATENT NO. : 11,159,261 B2  
APPLICATION NO. : 16/892116  
DATED : October 26, 2021  
INVENTOR(S) : Gibson et al.

It is certified that error appears in the above-identified patent and that said Letters Patent is hereby corrected as shown below:

In the Claims

Claim 4, Column 15, Line 61, please delete "for music form the" and insert --for music from the--.

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*